United States Patent [19]

Burrows et al.

[11] Patent Number: 5,393,654
[45] Date of Patent: Feb. 28, 1995

[54] PHOTOTHERMOGRAPHIC IMAGING MATERIALS AND SENSITISERS THEREFOR

[75] Inventors: Ronald W. Burrows, Harlow; David B. Oliff, Bishops Stortford, both of Great Britain; James B. Philip, Jr., Mahtomed, Minn.

[73] Assignee: Minnesota Mining and Manufacturing Company, St. Paul, Minn.

[21] Appl. No.: 202,944

[22] Filed: Feb. 28, 1994

[30] Foreign Application Priority Data

Mar. 16, 1993 [GB] United Kingdom ............... 9305324

[51] Int. Cl.$^6$ ............... G03C 1/498; G03C 1/20
[52] U.S. Cl. ............... 430/584; 430/607; 430/613; 430/614; 430/615; 430/617; 430/619; 430/620
[58] Field of Search ............... 430/581, 583, 584, 617, 430/618, 619, 620, 607, 613, 614, 615

[56] References Cited

U.S. PATENT DOCUMENTS 4,524,128  6/1985  Edwards et al. ............... 430/353
5,270,155 12/1993  Ozaki et al. ............... 430/505

FOREIGN PATENT DOCUMENTS 67092    4/1984  Japan .
3116041  5/1991  Japan ............... 430/583
1223298  2/1971  United Kingdom ............... 430/583

OTHER PUBLICATIONS

Chem Abstracts vol. 118: 142766h, Mujumdar et al, 1993.
Japanese #63-159841 with English abstract.
Japanese #60-140335 with English abstract.
Japanese #63-231437 with English abstract.
Japanese #63-259651 with English abstract.
Japanese #63-15245 with English abstract.
Japanese #63-304242 with English abstract.

*Primary Examiner*—Lee C. Wright
*Attorney, Agent, or Firm*—Gary L. Griswold; Walter N. Kirn; Mark A. Litman

[57] ABSTRACT

A heptamethine cyanine dye in which both nitrogen atoms of the cyanine chromophore bear a carboxyalkyl substituent comprising an alkyl chain of at least five carbon atoms. The dyes are useful as sensitisers in photothermographic imaging materials.

12 Claims, No Drawings

PHOTOTHERMOGRAPHIC IMAGING MATERIALS AND SENSITISERS THEREFOR

FIELD OF THE INVENTION

This invention relates to carboxyalkyl substituted heptamethine cyanine dyes and their use as sensitisers in photothermographic imaging materials.

BACKGROUND TO THE INVENTION

The increasing availability and use of light emitting diodes based on laser or semiconductor light sources emitting in the near infrared (NIR) region of the electromagnetic spectrum has created the need for high quality photographic imaging materials which are sensitive to this region. For example, imaging materials sensitised to the red and NIR may be used to produce hard copy from computer stored graphics data using a scanning laser diode source. The wavelengths of interest are primarily in the region from 650 to 900 nm, particularly 650 to 850 nm.

Due to environmental concerns, the use of conventional silver halide materials which are processed by known 'wet' chemistries are being replaced by 'dry' processed materials. Wet processing produces waste materials which are becoming more difficult to dispose of, both commercially and environmentally. Dry processed materials do not suffer from these disposal considerations.

Two main classes of dye have proven useful in the spectral sensitisation of photothermographic imaging materials; namely, merocyanine and cyanine dyes. Merocyanine dyes are often used to spectrally sensitise photothermographic materials to the visible part of the electromagnetic spectrum (400 to 650 nm), but extending their absorption into the NIR region has proven difficult. Cyanine dyes have also been used to spectrally sensitise photothermographic materials to visible radiation. Although frequently subject to residual dye stain problems, as well as being inferior in overall performance to merocyanine dyes, cyanine dyes that absorb in the NIR region can be readily prepared. In particular, heptamethine cyanine dyes, in which the nitrogen-containing heterocyclic end groups are linked by a seven-carbon polymethine chain, are generally found to absorb in the near infrared.

Many photothermographic imaging materials incorporate mercury and other heavy metal salts to enable an acceptable Dmin, a useful sensitivity (speed) (initially and after shelf storage of the coated material), as well as to reduce post processing print out in unexposed areas.

Environmental concerns over the use of mercury and its salts and their subsequent disposal has necessitated the preparation of materials which do not incorporate any mercury species. Consequently, photothermographic materials must be constructed which overcome the loss of the aforesaid advantages. Various non-mercury antifoggants have been proposed, mainly involving heterocyclic tribromomethyl compounds. While these have gained a considerable degree of acceptance, there remains a problem in that sensitising dyes commonly used in mercury-containing systems often give poor results in mercury-free systems.

It will be appreciated that a vast literature exists on the subject of photothermographic media, most of which teaches the use of sensitising dyes. In many cases, the structural formulae given for the sensitiser dyes are very broad and may encompass the dyes used in the present invention. However, there is no evidence of any reduction to practice within the scope of the present invention. The structural formulae generally cover cyanine dyes and usually encompass heptamethine chains, although actual examples of such dyes are rarely given. The substituents on the nitrogen atoms of the cyanine system are usually alkyl groups, which may optionally be substituted with a variety of groups, including carboxyl groups. However, no special advantage is taught for carboxyl groups, least of all in combination with a heptamethine chain.

For example, Japanese Patent No. 63-159841 discloses dry silver type photothermographic media suitable for He—Ne or semiconductor laser exposure. Thirty-one separate general formula are given for the sensitising dyes, one of which defines heptamethine cyanine dyes. However, none of the exemplified dyes has a carboxyalkyl substituent on either of the nitrogen atoms of the cyanine system, the majority being sulphoalkyl-substituted and the remainder alkyl-substituted.

Japanese Patent Publication Nos. 60-140335, 63-231437 and 63-259651 disclose photothermographic media of the dry silver type comprising a range of sensitising dyes encompassing those of Formula (I). None of the exemplified dyes is a heptamethine cyanine dye. One example in JP 60-140335 shows carboxyalkyl substitution on a trimethine dye. Sulphoalkyl substituents are apparently preferred.

U.S. Pat. Nos. 4639414, 4740455, 4741966 and 4751175, and Japanese Patent No. 63-15245 disclose photothermographic media comprising silver halide and a reducible silver salt (usually silver benzotriazole) dispersed in a hydrophilic binder, normally gelatin. Although heptamethine cyanine dyes are encompassed by the general formulae given for the sensitisers there is no example of a heptamethine cyanine dye bearing a carboxyalkyl substituent on either of the nitrogen atoms of the cyanine system.

Japanese Patent No. 63-304242 discloses photothermographic media comprising silver halide, a reducing agent, a binder and a dye-precursor that forms or releases a dye on reaction with the oxidised reducing agent. There is no mention of any silver salt other than the silver halide. The silver halide is IR-sensitised and sixty-seven examples of cyanine and merocyanine sensitiser dyes are given, one of which (No. 64) is a bis-carboxyethyl substituted heptamethine cyanine dye. There is no indication of any advantage associated with this particular compound, all the other cyanine dyes being alkyl or sulphoalkyl substituted. These formulations differ from those of the present invention because they do not contain a light-insensitive reducible silver source and they are aqueous-(gelatin)-based.

U.S. Pat. No. 4835096 discloses the use of heptamethine cyanines dyes with a particular substitution pattern on the terminal aromatic rings as sensitisers for dry silver photothermographic media. Possible substituents for the nitrogen atoms of the cyanine system are said to include alkyl groups of up to 5 carbon atoms, although ethyl is the only example given. There is no mention of substituted alkyl groups, or of mercury-free formulations. Japanese Patent Application No. 03-163440 discloses photothermographic media comprising photosensitive silver halide, an oxidation-reduction image forming component consisting of a reducible organic silver salt and a reducer, a binder, and a sensitising dye of defined structure. The sensitising dyes disclosed have a heptamethine cyanine nucleus in which both nitrogen atoms bear a carboxyalkyl substituent of formula —$(CH_2)_nCO_2H$ where $n=1-4$. The maximum value of n shown in the Examples is 3, with most examples having $n=2$.

The present invention provides alternative spectral sensitisers which find application in both mercury-containing and more particularly mercury-free photothermographic materials.

BRIEF SUMMARY OF THE INVENTION

According to the present invention there is provided a heptamethine cyanine dye in which both nitrogen atoms of the cyanine chromophore bear a carboxyalkyl substituent comprising an alkyl chain of at least five carbon atoms.

Dyes in accordance with the invention have a nucleus represented by Formula (I):

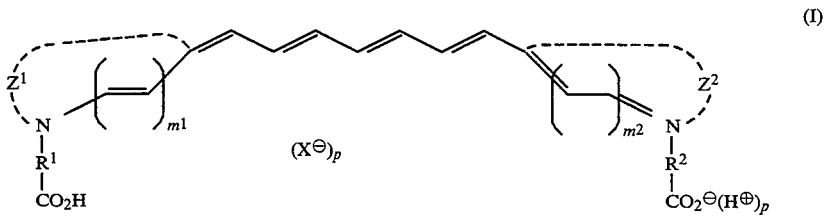

(I)

in which;

p is 0 or 1,
$m^1$ and $m^2$ are independently 0 or 1,
$X^\ominus$ is an anion,
$R^1$ and $R^2$ are independently selected from alkylene groups having from 5 to 25 carbon atoms, and
$Z^1$ and $Z^2$ independently represent the atoms necessary to complete a heterocyclic ring or fused ring system.

Examples of rings and fused ring systems completed by $Z^1$ and $Z^2$ include thiazole, selenazole, oxazole, imidazole, 2-quinoline, 4-quinoline, indolenine etc, and derivatives of these rings comprising one or more fused benzene or naphthalene rings.

Preferred dyes have a nucleus of Formula (II):

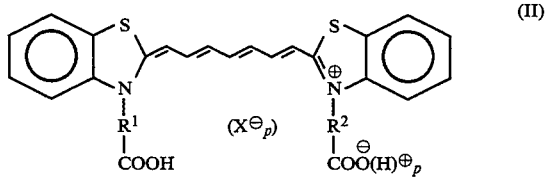

(II)

in which;

P, $X^\ominus$, $R^1$ and $R^2$ are defined as before.

The invention also provides photothermographic elements having a photothermographic medium comprising silver halide, a reducible silver salt and a reducing agent for silver ion and, as a sensitising dye, a compound of Formula (I).

The present invention utilises heptamethine cyanine dyes in which both of the nitrogen atoms of the cyanine dye nucleus bear an alkyl carboxylic acid substituent with 5 or more alkyl carbon atoms as sensitising dyes for dry silver type photothermographic media. The dyes absorb strongly in the wavelength range 650 to 900 nm to provide photothermographic media which are particularly suitable for use with a number of commercially available laser diodes. The presence of the relatively long alkyl carboxylic acid substituents confers sensitivity improvements in both mercury-free and mercury-containing formulations when compared with dyes bearing alkyl, sulphoalkyl, or shorter carboxyalkyl substituents on the nitrogen atoms of the cyanine system. The enhanced sensitising effect is apparently restricted to heptamethine cyanine dyes, as the presence of the alkyl carboxy substituent in tri- and pentamethine cyanine dyes is found to be detrimental to sensitivity.

A further unexpected benefit of the longer chain carboxyalkyl substituents is an improvement in sensitivity at long wavelengths. Normally, the absorption characteristics of a cyanine dye are largely unaffected by the length of the alkyl substituents on the nitrogen atoms. Indeed, the solution spectra of a range of dyes of Formula (II) where $R^1$ and $R^2$ vary from —$CH_2$— to —$(CH_2)_{16}$— are virtually identical, with a maximum absorption in the range 763–769 nm. When formulated in photothermographic media, however, the dyes of the invention, in which $R^1$ and $R^2$ have 5 or more carbon atoms, show an extended spectral response and are found to confer substantial improvements in sensitivity at wavelengths greater than 800nm compared to the dyes of the prior art having shorter carboxyalkyl chains. The explanation for this behaviour is not known, but since many commercially available laser diodes emit at 830 nm, the effect is a very useful one.

Another unexpected benefit is the ability to incorporate high molar concentrations of the dyes without affecting the Dmin of the final image. With dyes of the prior art, having short carboxyalkyl chains, attempts to increase the sensitivity by adding more sensitising dye are frustrated, beyond a certain point, by unacceptably high fog. Surprisingly, the dyes of the invention do not encounter this problem, and the full sensitising potential can be exploited. Furthermore, the dyes of the invention can be added in quantities sufficient to exert an acutance effect. Normally, it is necessary to add an inert (non-sensitising) dye for acutance purposes, which inevitably entails a sacrifice in speed, but the dyes of the invention can provide improved image sharpness without loss of sensitivity.

In addition to providing sensitisation to the desired wavelength range, the dyes of general Formula (I) also provide useful increases in the speed of the photothermographic media when compared with known dyes sensitising to this wavelength region.

DESCRIPTION OF PREFERRED EMBODIMENTS

Preferred groups represented by $R^1$ and $R^2$ are alkylene groups containing 5 to 20 and more preferably 5 to 16 carbon atoms.

In Formula (I), $Z^1$ and $Z^2$ independently represent the atoms necessary to complete any heterocyclic ring or fused ring system capable of forming part of a cyanine dye. Most commonly, $Z^1$ and $Z^2$ independently represent the atoms chosen from C, N, O, S and Se that complete a 5- or 6-membered ring optionally bearing one or more fused ring substituents. Thus $Z^1$ and $Z^2$ may independently complete, for example, a thiazole, selenazole, oxazole, imidazole, indolenine, 2-quinoline or 4-quinoline ring, any of which may possess one or more fused ring substituents, as in benzthiazole, benzselenazole, naphthoxazole etc. In preferred embodiments, both $Z^1$ and $Z^2$ complete benzthiazole rings.

The terminal nuclei completed by $Z^1$ and $Z^2$ may optionally possess one or more substituents selected from alkyl groups (e.g., methyl, ethyl, isopropyl etc.), halogen atoms (e.g., fluorine, chlorine, bromine and iodine), a hydroxy group, alkoxy groups (e.g., methoxy, ethoxy etc.), aryloxy groups (e.g., phenoxy, hydroxyphenoxy etc.), amino groups (e.g., amino, methylamino, dimethylamino etc.), a cyano group, acylamino groups (e.g., acetylamino, benzoylamino etc.), diacylamino groups (e.g., succinimido etc.), ureido groups (e.g., methylureido etc.), sulphonamido groups (e.g., methylsulphonamide etc.), acyloxy groups (e.g., acetyloxy etc.), sulphamoyl groups (e.g., N-ethylsulphamoyl etc.), alkylcarbonyl groups, arylcarbonyl groups, alkoxycarbonyl groups (e.g., methoxycarbonyl, ethoxycarbonyl etc.), aryloxycarbonyl groups (e.g., phenoxycarbonyl etc.), alkoxycarbonyl amino groups (e.g., ethoxycarbonylamino etc.), aryl groups (e.g., phenyl, tolyl etc.), hydroxyalkyl groups (e.g., hydroxyethyl, hydroxypropyl etc.), alkoxyalkyl groups (e.g., methoxyethyl, methoxypropyl etc.), mercapto groups, alkylthio groups, arylthio groups, alkylsulphonyl groups, arylsulphonyl groups, acyl groups, aralkyl groups, alkyl groups containing a carboxyl group (e.g., carboxymethyl, carboxyethyl etc.), each of which groups may where appropriate comprise up to 14, preferably up to 10 carbon atoms.

As is well understood in this technical area, a large degree of substitution is not only tolerated, but is often advisable. As a means of simplifying the discussion and recitation of these groups, the terms "groups" and "moiety" are used to differentiate between chemical species that allow for substitution or which may be substituted and those which do not or may not be so substituted. For example, the phrase "alkyl group" is intended to include not only pure hydrocarbon alkyl chains, such as methyl, ethyl, octyl, cyclo-hexyl, iso-octyl, tertbutyl and the like, but also alkyl chains bearing conventional substituents known in the art, such as hydroxyl, alkoxy, phenyl, halogen (F, Cl, Br and I), cyano, nitro, amino etc. The phrase "alkyl moiety" or "alkyl" on the other hand is limited to the inclusion of only pure hydrocarbon alkyl chains, such as methyl, ethyl, propyl, cyclohexyl, iso-octyl, t-butyl and the like.

The heptamethine chain may include a bridging or rigidising group of the type well known in the art. Such groups generally comprise a 5-, 6- or 7-membered heterocyclic or carbocyclic ring nucleus or a heterocyclic or carbocyclic fused ring system comprising up to 14 ring atoms. Each ring or fused ring system incorporates at least one carbon atom of the heptamethine chain within its ring structure with the remainder of the ring atoms being selected from C,N,O,S and Se. Examples of bridging groups include: cyclopentane, cyclohexane,

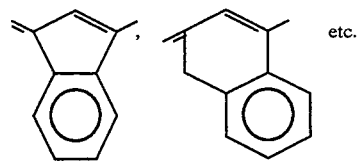

etc.

In Formula (I), when p=1, $X^\ominus$ may be any anion commonly found in cyanine dye chemistry, such as chloride, bromide, iodide, perchlorate, p-toluensulphonate etc., and may be separate or may be covalently attached to one of $R^1$ and $R^2$. Most commonly, X comprises the carboxy group of one of $R^1$ and $R^2$ in ionised form (i.e. p=0).

Examples of dyes suitable for use in the present invention are shown in Table 1 below together with dyes of the prior art, prepared for comparison purposes.

TABLE 1

| Dye No. | n | $R^3$ | $R^4$ | λmax (nm) (MeOH + Et₃N) |
|---|---|---|---|---|
| 1(c) | 1 | H | H | 764 |
| 2(c) | 2 | " | " | 765 |
| 3(c) | 4 | " | " | 765 |
| 4 | 5 | " | " | 765 |
| 5 | 7 | " | " | 768 |
| 6 | 10 | " | " | 765 |
| 7 | 11 | " | " | 769 |
| 8 | 16 | " | " | 763 |
| 9 | 5 | —CH₃ | —CH₃ | 774 |
| 10 | 5 | —OCH₃ | H | 780 |
| 11 | 5 | —CH₃ | H | 770 |

Further examples of dyes in accordance with the invention have the following structures (λ max refers to the absorption maximum in nm recorded for methanol solutions containing a trace of triethylamine):

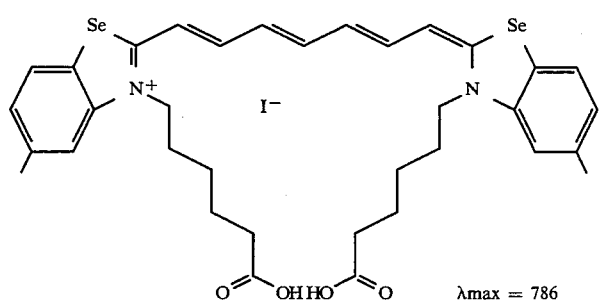
(12) λmax = 786

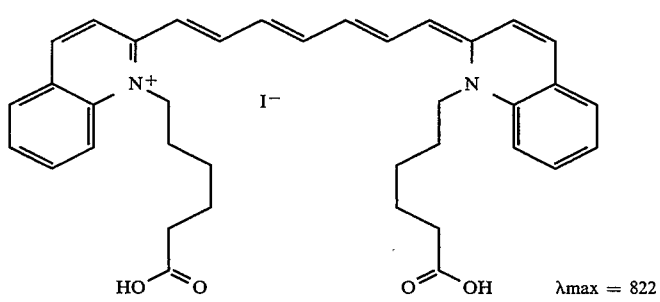
(13) λmax = 822

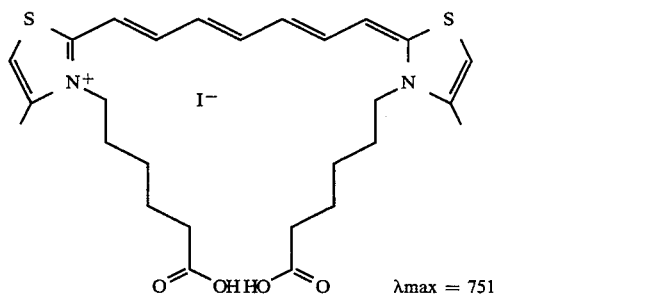
(14) λmax = 751

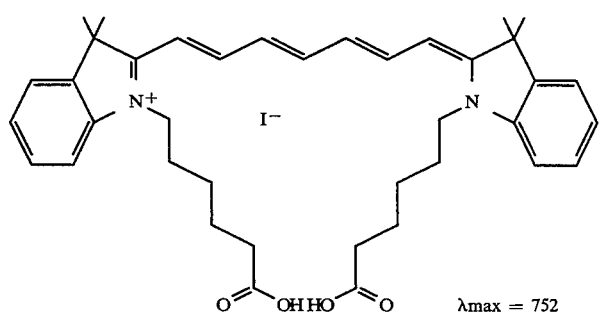
(15) λmax = 752

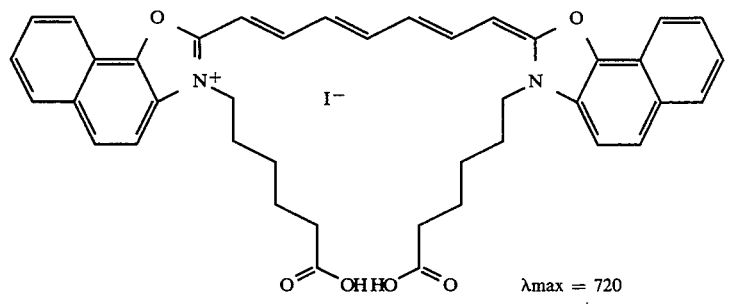
(16) λmax = 720

The dyes of general Formula (I) are generally incorporated into the photothermographic media in an amount of from 0.5 to 500 mg per mole of silver halide, preferably 5 to 250 mg per mole of silver halide. They may be added in conjunction with supersensitisers such as 2-mercaptobenzimidazoles (U.S. Ser. No. 07/846919, filed 3rd March 1992), metal chelating agents (U.S. 4,873,184), and pyridine, pyrimidine and triazine derivatives (JP 63-023145).

Heat developable photosensitive materials which produce photographic images using a dry heat processing method (referred to herein as "photothermographic materials") are known and described, for example, in U.S. Pat. Nos. 3152904 and 3457075 and in "Thermally Processed Silver Systems" by D. Morgan and B. Shely, Imaging Processes and Materials, Neblette's Eighth Edition; Edited by J. M. Sturge, V. Walworth and A Shepp, p.2 (1969). Such photothermographic materials have a photosensitive medium comprising a reducible silver source, e.g., an organic silver salt, a catalytic amount of a photocatalyst, e.g., silver halide, and a reducing agent for silver ion ordinarily dispersed in a (organic) binder matrix. The photothermographic materials are stable at ambient temperatures but when heated to higher temperatures, e.g., 80° C. or higher, after imagewise exposure, they produce silver through a redox reaction between the reducible silver source (acting as an oxidising agent) and the reducing agent. This redox reaction is accelerated by the catalytic action of the exposure generated silver catalyst. The silver which is produced by reduction of the organic silver salt in the exposed areas provides a black image which contrasts with the unexposed areas. This results in the formation of an image.

It is customary to include an effective antifoggant in such photothermographic materials since, without an antifoggant, some generation of silver in the unexposed areas takes place upon thermal development, resulting in a poor differential between the image and background fog. In the past, the most effective antifoggant has been the mercuric ion. The use of mercury compounds as antifoggants in photothermographic materials is disclosed in, for example, U.S. Patent Specification No. 3589903. However, mercury compounds are environmentally undesirable and due to an increasing desire to remove even trace amounts of possible pollutants from commercial articles, other non-mercury antifoggants, for example, as disclosed in U.S. Patent Specification Nos. 4546075 and 4452885 and Japanese Patent Publication No. 59-57234 are preferred.

Particularly preferred non-mercury antifoggants comprise a heterocyclic compound bearing one or more substituents represented by —$CX^1X^2X^3$ where $X^1$ and $X^2$ are halogen (e.g., F, Cl, Br and I) and $X^3$ is hydrogen or halogen, such as those compounds disclosed in U.S. Pat. Nos. 3874946 and 4756999. Examples of suitable antifoggants include:

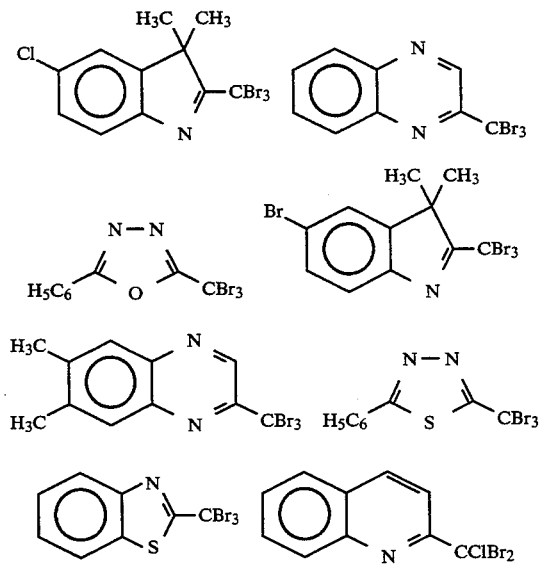

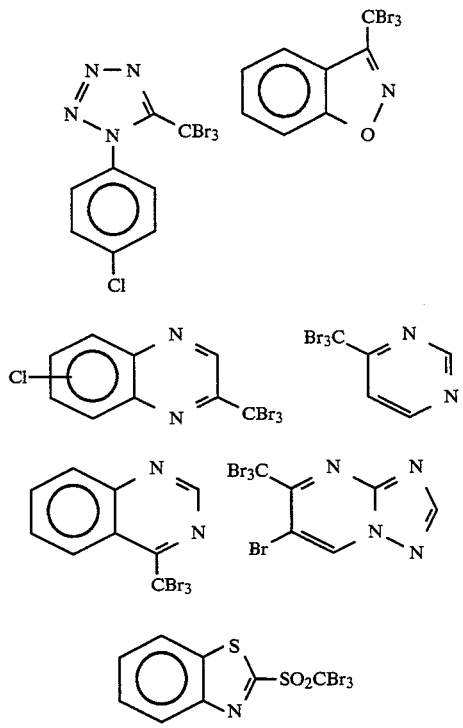

Further highly suitable antifoggants are disclosed in U.S. Pat. No. 5028523 and our UK Patent Application Nos. 92221383.4, 9300147.7 and 9311790.1.

Photothermographic materials are usually constructed as one or two ,imaging layers on a substrate. Single layer constructions must contain the silver source material, the silver halide and the developer, as well as optional additional materials, such as toners, coating aids, and other adjuvants. Two-layer constructions must contain the reducible silver source and silver halide in one emulsion layer (usually the layer adjacent the substrate) and the other ingredients in the second layer or both layers.

The silver halide may be any photosensitive silver halide, such as silver bromide, silver iodide, silver chloride, silver bromoiodide, silver chlorobromoiodide etc., and may be added to the imaging layer in any fashion which places it in catalytic proximity to the reducible silver source. The silver halide generally comprises from 0.75 to 15% by weight of the imaging layer, although larger amounts up to 20 or 25% by weight are useful. The silver halide may be prepared in situ by conversion of a portion of silver soap by reaction with halide ions or it may be preformed and added during soap generation, or a combination of these methods is possible. The latter is preferred.

The reducible silver source may comprise any material which contains a reducible source of silver ions. Silver salts of organic and hetero-organic acids, particularly long chain fatty carboxylic acids (comprising from 10 to 30, preferably 15 to 25 carbon atoms), are preferred. Complexes of organic or inorganic silver salts in which the ligand has a gross stability constant for silver ion of between 4.0 and 10.0 are also useful. Examples of suitable silver salts are disclosed in Research Disclosure Nos. 17029 and 29963 and include: salts of organic acids, e.g., gallic acid, oxalic acid behenic acid, stearic acid, palmitic acid, lauric acid and the like; silver carboxyalkylthiourea salts, e.g., 1-(3-carboxypropyl)thiourea, 1-(3-carboxypropyl)-3,3-dimethylthiourea and the like; complexes of silver with the polymeric reaction product of an aldehyde with a hydroxy-substituted aromatic carboxylic acid, e.g., aldehydes, such as formaldehyde, acetaldehyde and butyraldehyde, and hydroxy-substituted acids, such as salicylic acid, benzilic acid, 3,5-dihydroxybenzilic acid and 5,5-thiodisalicylic acid, silver salts or complexes of thiones, e.g., 3-(2-carboxyethyl)-4-hydroxymethyl-4-thiazoline-2-thione and 3-carboxymethyl-4-thiazoline-2-thione complexes or salts of silver with nitrogen acids selected from imidazole, pyrazole, urazole, 1,2,4-triazole and 1H-tetrazole, 3-amino-5-benzylthio-1,2,4-triazole and benzotriazole; silver salts of saccharin, 5-chlorosalicylaldoxime and the like; and silver salts of mercaptides.

The preferred silver source is silver behenate.

The reducible silver source generally comprises from 5 to 70, preferably from 7 to 45% by weight of the imaging layer. The use of a second imaging layer in a two-layer construction does not affect the percentage of the silver source.

The reducing agent for silver ion may comprise any conventional photographic developer, such as phenidone, hydroquinones and catechol, although hindered phenols are preferred. The reducing agent generally comprises from 1 to 10% by weight of the imaging layer, but in a two-layer construction, if the reducing agent is in the layer separate from that containing the reducible silver source, slightly higher proportions, e.g., from 2 to 15%, tend to be moire desirable. Colour photothermographic materials, such as those disclosed in U.S. Pat. No. 4460681, are also contemplated in the practice of the present invention.

Examples of suitable reducing agents are disclosed in US Patent Nos. 3770448, 3773512 and 3593863, and Research Disclosure Nos. 17029 and 29963, and include aminohydroxycycloalkenone compounds, e.g., 2-hydroxypiperidino-2-cyclohexenone; esters of amino reductones as developing agent precursors, e.g., piperidino hexose reductone monoacetate; N-hydroxyurea derivatives, e.g., N-p-methylphenyl-N-hydroxyurea; hydrazones of aldehydes and ketones, e..g., anthracene aldehyde phenylhydrazone; phosphoramidophenols; phosphoramidoanilines; polyhydroxybenzenes, e.g., hydroquinone, t-butylhydroquinone, isopropylhydroquinone and (2,5-dihydroxyphenyl)methylsulfone; sulfhydroxamic acids, e.g., benzenesulfhydroxamic acid; sulfonamidoanilines, e.g., 4-(N-methanesulfonamido)aniline; 2-tetrazolylthiohydroquinones, e.g., 2-methyl-5-(1-phenyl-5-tetrazolylthio)hydroquinone; tetrahydroquinoxalones, e.g., 1,2,3,4,-tetrahydroquinoxaline; amidoximes; azines, e.g., a combination of aliphatic carboxylic acid aryl hydrazides and ascorbic acid; a combination of a polyhydroxybenzene and a hydroxylamine, a reductone and/or a hydrazine; hydroxamic acids; a combination of azines and sulfonamidophenols; α-cyanophenylacetic acid derivatives; a combination of a bis-β-naphthol and a 1,3-dihydroxybenzene derivative; 5-pyrazolones; sulfonamidophenol reducing agents; 2-phenylindane-1,3-dione and the like; chromans; 1,4-dihydropyridines, such as 2,6-dimethoxy-3,5-dicarbethoxy-1,4-dihydropyridine; bisphenols, e.g., bis(2-hydroxy-3-t-butyl-5-methylphenyl)methane, bis(6-hydroxy-m-tolyl) mesitol, 2,2-bis(4-hydroxy-3-methylphenyl)propane, 4,4-ethylidenebis(2-t-butyl-6-methylphenol, UV sensitive ascorbic acid derivatives and 3-pyrazolidones.

The preferred developers are hindered phenols of general Formula (III)

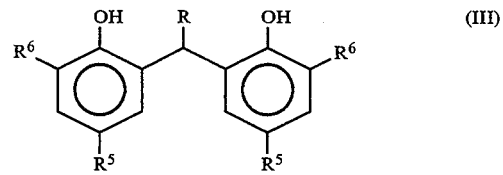

in which;

R represents hydrogen or an alkyl group, generally comprising up to 10 carbon atoms, e.g., —$C_4H_9$, or 2,4,4-trimethylpentyl, and $R^5$ and $R^6$ represent alkyl groups of up to 5 carbon atoms, e.g., methyl, ethyl, t-butyl, etc.

The presence of a toner sometimes referred to as a tone modifier, is not essential, but is highly preferred. Examples of suitable toners are disclosed in Research Disclosure No. 17029 and include: imides, e.g., phthalimide; cyclic imides, pyrazolin-5-ones and a quinazolinone, such as succinimide, 3-phenyl-2-pyrazolin-5-one, 1-phenylurazole, quinazoline and 2,4-thiazolidinedione; naphthalimides, e.g., N-hydroxy-1,8-naphthalimide; cobalt complexes, e.g., cobaltic hexammine trifluoroacetate, mercaptans, e.g., 3-mercapto-1,2,4-triazole; N-(aminomethyl)aryl dicarboximides, e.g., N-(dimethylaminomethyl)phthalimide; a combination of blocked pyrazoles, isothiuronium derivatives and certain photobleach agents, e.g., a combination of N,N'-hexamethylene bis(1-carbamoyl-3,5-dimethylpyrazole), 1,8-(3,6-dioxaoctane)bis(isothiuronum trifluoroacetate) and 2-(tribromomethylsulfonyl) benzothiazole); merocyanine dyes, such as 3-ethyl-5-[(3-ethyl-2-benzothiazolinylidene)-1-methylethylidene]-2-thio-2,4-oxazolidinedione; phthalazinone, phthalazinone derivatives or metal salts of these derivatives, such as 4-(1-naphthyl)phthalazinone, 6-chlorophthalazinone, 5,7-dimethoxyphthalazinone and 2,3-dihydro-1,4-phthalazinedione; a combination of phthalazinone and a sulfinic acid derivative, e.g., 6-chlorophthalazinone plus sodium benzene sulfinate or 8-methylphthalazinone plus sodium p-tolysulfinate; a combination of phthalazinone plus phthalic acid; a combination of phthalazine including an adduct of phthalazine and maleic anhydride) and at least one compound selected from phthalic acid, a 2,3-naphthalene dicarboxylic acid or an o-phenylene acid derivative and anhydrides thereof, e.g., phthalic acid, 4-methylphthalic acid, 4-nitrophthalic acid and tetrachlorophthalic anhydride; quinazolinediones, benzoxazine and naphthoxazine derivatives; benzoxazine-2,4-diones, e.g., 1,3-benzoxazine-2,4-dione; pyrimidines and asym-triazines, e.g., 2,4-dihydroxypyrimidine, and tetrazapentalene derivatives, e.g., 3,6-dimercapto-1,4-diphenyl-1H,4H-2,3a,5,6a-tetrazapentalene.

The preferred toner is phthalazine:

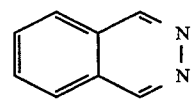

The toner, when present, is generally included in an amount of from 0.2 to 12% by weight of the imaging layer.

The photothermographic chemistry of the element is typically applied to the support in a binder. A wide range of binders may be employed in the imaging layer(s) of the photothermographic element. Suitable binders are transparent or translucent, are generally colourless and include natural polymers, synthetic resins, polymers and copolymers and other film forming media such as: gelatin, gum arabic, poly(vinyl alcohol), hydroxyethyl cellulose, cellulose acetate, cellulose acetate butyrate, poly(vinyl pyrrolidone), casein, starch, poly(acrylic acid), poly(methylmethacrylic acid), poly(vinyl chloride) poly(methacrylic acid), copoly (styrene-maleic anhydride), copoly(styrene-acrylonitrile), copoly(styrene-butadiene), polyvinyl acetals, e.g., poly(vinyl formal) and poly(vinyl butyral), polyesters, polyurethanes, phenoxy resins, poly(vinylidene chloride), polyepoxides, polycarbonates, poly(vinyl acetate), cellulose esters and polyamides. The binders may be coated from aqueous or organic solvents or an emulsion.

The photothermographic elements of the invention are prepared by simply coating a suitable support or substrate with the one or more imaging layers containing the photothermographic chemistry and, optionally, a barrier layer. Suitable barrier layers are well known in the art. Each layer is generally coated from a suitable solvent using techniques known in the art. Exemplary supports include materials, such as paper, polyethylene-coated paper, polypropylene-coated paper, parchment, cloth and the like; sheets and foils of metals, such as aluminium, copper, magnesium and zinc; glass and glass coated with metals such as chromium alloys, steel, silver, gold and platinum; synthetic polymeric materials, such as poly(alkyl methacrylates), e.g., poly(methyl methacrylate), polyesters, e.g., poly(ethylene terephthalate), poly(vinyl acetals), polyamides, e.g., nylon, cellulose esters, e.g., cellulose nitrate, cellulose acetate, cellulose acetate propionate, cellulose acetate butyrate, and the like.

A variety of conventional additives, such as surfactants, anti-oxidants, stabilisers, plasticisers, ultraviolet absorbers, coating aids etc., may be used in the preparation of the photothermographic elements of the invention.

It is not essential for the photothermographic elements of the invention to comprise a separate support since each binder layer, e.g., a synthetic polymer, together with the photothermographic chemistry may be cast to form a self-supporting film.

The supports can be sub-coated with known subbing materials such as copolymers and terpolymers of vinylidene chloride and acrylic monomers, such as acrylonitrile and methyl acrylate, and unsaturated dicarboxylic acids, such as itaconic or acrylic acid, carboxymethyl cellulose, polyacrylamide; and similar polymeric materials.

The support can also carry a filter or antihalation layer, such as one comprising a dyed polymer layer, which absorbs the exposing radiation after it passes through the radiation-sensitive layer and eliminates unwanted reflection from the support.

The invention will now be described with reference to the accompanying Examples, in which Example 1 exemplifies dye preparation and the other Examples illustrate their use in photothermographic elements incorporating either a mercury-based antifoggant (Example 2) or a non-mercury antifoggant (Examples 3, 4 and 5).

EXAMPLE 1

The synthesis of cyanine dyes of the invention is exemplified bellow with reference to the synthesis protocols for Dye No. 4 (See Table I).

Preparation of 2-methyl-3-(5-carboxypentyl) benzothiazolium bromide:

2-methyl benzothiazole (19.5g, 0.1M) and 6-bromohexanoic acid (15.3g, 0.1M) were mixed and heated at 120° C. for 4 hours under continuous agitation. The resulting solid was broken up, ground with ether and then filtered. The filtrate was washed with more ether (250ml) to yield an off-white powder (57.5g).

Other quaternary salts were prepared in a similar manner with longer heating times being necessary for the longer chained bromo-acids.

The quaternary salts were coupled with various groups to prepare the necessary biscarboxyalkyl substituted heptamethine cyanine dyes. The synthesis of the various dyes is exemplified by the following procedure.

Preparation of biscarboxyalkyl dyes:

a mixture of 2-methyl-3-(5-carboxypentyl)benzothiazolium bromide (3.03 g, 0.01M), glutaconic aldehyde dianil hydrochloride (1.42 g, 0.005M) and acetonitrile (25 ml) were heated to reflux under continuous agitation. Triethylamine (4.2 ml, 0.03M) was then added and the resulting mixture refluxed for 10 minutes. After cooling overnight, the mixture was filtered and the filtrate washed with acetonitrile (10 ml), water (10 ml) and finally ethanol (10 ml). The filtrate was purified by refluxing with 95% methanol and filtering off the desired compound from the hot mixture as the free acid. Yield for Dye 4=0.8 g The other biscarboxyalkyl dyes were prepared in a similar manner but starting from the appropriate precursors.

In the following Examples the following materials were employed:

BUTVAR B-76—POLY(VINYL BUTYRAL), commercially available from Monsanto.

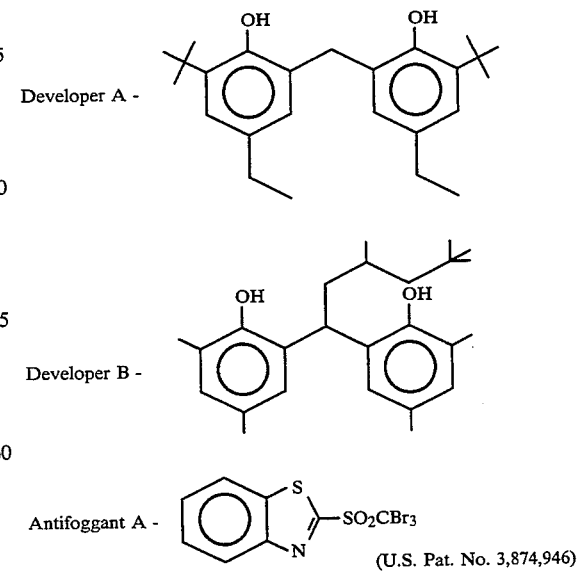

EXAMPLE 2

Homogenate A

A preformed silver behenate full soap (307 g) containing 10% by weight silver iodobromide (98 mol % Br, 2 mol % I was homogenised with toluene (545 g), butanone (1634 g) and BUTVAR B-76 (13.5 g).

Homogenate B
as for Homogenate A, but using non-preformed full soap (i.e. no silver halide).

A series of coating solutions were prepared as follows, differing only in the identity of the sensitising dye used (Dyes 4,5,6 and 8 of Table 1):

Homogenate A ... 100 g
Homogenate B ... 100 g
2-butanone ... 50 ml
mercuric bromide (10% w/w in MeOH) ... 2 ml
BUTVAR B-76 ... 30 g
Developer A ... 4 g
dye (0.2% w/w soln) ... 6.5 ml (NB—this quantity was not optimised for the different dyes. For dyes 4,5 & 6 the solvent was DMF, and for dye 8 it was MeOH/Et$_3$N 99:1)

The ingredients were mixed in the order given at 21° C. under minus blue light until the addition of the dye, at which point IR safelight conditions were used (Kodak Wratten Filter No. 7), then knife coated on white vesicular polyester base at a wet thickness of 150 microns and dried for 3 mins. at 85°. A top coat comprising the following formulation was added at 100 microns wet thickness and dried similarly:

acetone ... 175 ml
2-propanol ... 40 ml
methanol ... 15 ml
cellulose acetate ... 8.0 g
phthalazine ... 1.0 g
4-methylphthalic acid ... 0.72 g
tetrachlorophthalic acid ... 0.22 g
tetrachlorophthalic anhydride ... 0.5 g The resulting coatings were evaluated by exposure (10 sec) to a white light source through narrow cut filters (780 nm or 810 nm) followed by thermal processing at 127° for 10 sec. DlogE curves were plotted in the usual manner, and the following parameters recorded:

Dmin—minimum developed density (fog)
Dmax—maximum developed density
Con2—contrast between densities 0.6 and 1.2 above fog
Speed1—relative log speed at 0.2 above fog

| Dye No | Chain Length | Filter | Dmax | Dmin | Con2 | Speed1 |
|---|---|---|---|---|---|---|
| 4 | 5 | 810 | 1.63 | 0.16 | 0.92 | 1.39 |
| 5 | 7 | 780 | 1.60 | 0.25 | 2.98 | 1.98 |
| 6 | 10 | 780 | 1.63 | 0.24 | 3.44 | 1.84 |
| 8 | 16 | 780 | 1.74 | 0.29 | 4.50 | 2.05 |

These results show that the dyes of the invention have useful sensitising properties in conventional mercury-containing formulations. Although there is a tendency for increased fog with the longer chain lengths, this might be controlled by adjusting the dye quantity, or including an additional antifoggant at the coating stage.

EXAMPLE 3

The following formulation was prepared and coated on vesicular polyester base at 175 microns wet thickness and dried 4 mins at 70° C.:

Homogenate A (as in Ex.2) ... 100 g
Homogenate B (as in Ex.2) ... 100 g
2-butanone ... 50 ml
BUTVAR B-76 ... 30.3 g
pyridinium hydrobromide perbromide ... 0.18 g (in 3 ml MeOH)
calcium bromide (10% soln in MeOH) ... 1.3 ml
2-(4-chlorobenzoyl)benzoic acid (12% soln in MeOH) ... 10 ml
2-mercaptobenzimidazole (1% soln in MeOH) ... 12 ml
Developer B ... 6.64 g The first 6 ingredients were mixed under minus blue safelight conditions in the order given at 13°, stored at 7° overnight, and the remaining ingredients added at 21°. To 300 g of the resulting mixture (under IR safelight conditions) were added varying amounts of the relevant dye as a 0.2% solution in methanol/triethylamine 99:1 in order to optimise the sensitometry for each dye. Optimum quantities for the various dyes were found to be:

Dye 1—1.5 ml; Dye 2—2.25 ml; Dye 3—2.25;
Dye 4—4.0 ml; Dye 5—5.0 ml; Dye 6—4.5 ml;
Dye 7—3.25 ml; Dye 8—4.25 ml.

The following topcoat was added (100 microns wet thickness, dried 4 mins at 70° C.):

acetone ... 140 ml
2-butanone ... 67 ml.
methanol ... 27.5 ml
cellulose acetate ... 9.0 g
phthalazine ... 1.0 g
4-methylphthalic acid ... 0.7 g
tetrachlorophthalic acid ... 0.6 g
tetrachlorophthalic anhydride ... 0.65 g
Antifoggant A ... 1.0 g The resulting coatings were evaluated as before, exposure being conducted through a variety of narrow cut filters, and also a 0.67 neutral density filter (i.e. white light exposure). The following table records the sensitometric data for the optimum loading of each dye, allowing valid comparisons to be drawn:

| Filter | Dye No | Chain Length | Dmax | Dmin | Con2 | Speed1 |
|---|---|---|---|---|---|---|
| neutral | 1(c) | 1 | 1.68 | 0.20 | 3.08 | 1.56 |
| " | 2(c) | 2 | 1.71 | 0.19 | 4.18 | 2.18 |
| " | 3(c) | 4 | 1.65 | 0.09 | 2.66 | 1.89 |
| " | 4 | 5 | 1.71 | 0.14 | 3.44 | 2.13 |
| " | 5 | 7 | 1.72 | 0.16 | 4.18 | 2.09 |
| " | 6 | 10 | 1.71 | 0.11 | 3.66 | 2.17 |
| " | 7 | 11 | 1.72 | 0.08 | 3.08 | 2.00 |
| " | 8 | 16 | 1.71 | 0.14 | 3.66 | 2.20 |
| 780 nm | 1(c) | 1 | 1.67 | 0.19 | 2.93 | 0.90 |
| " | 2(c) | 2 | 1.68 | 0.20 | 3.90 | 1.57 |
| " | 3(c) | 4 | 1.61 | 0.10 | 2.79 | 1.02 |
| " | 4 | 5 | 1.65 | 0.15 | 4.18 | 1.29 |
| " | 5 | 7 | 1.67 | 0.11 | 3.90 | 1.21 |
| " | 6 | 10 | 1.67 | 0.10 | 3.90 | 1.30 |
| " | 7 | 11 | 1.66 | 0.12 | 3.66 | 1.22 |
| " | 8 | 16 | 1.63 | 0.09 | 3.44 | 1.28 |
| 830 nm | 1(c) | 1 | 1.67 | 0.29 | 2.25 | 0.68 |
| " | 2(c) | 2 | 1.72 | 0.19 | 3.25 | 1.41 |
| " | 3(c) | 4 | 1.67 | 0.19 | 1.09 | 1.35 |
| " | 4 | 5 | 1.63 | 0.21 | 3.08 | 1.71 |
| " | 5 | 7 | 1.72 | 0.18 | 3.66 | 1.54 |
| " | 6 | 10 | 1.74 | 0.14 | 3.44 | 1.41 |
| " | 7 | 11 | 1.77 | 0.14 | 3.25 | 1.52 |
| " | 8 | 16 | 1.73 | 0.24 | 3.90 | 1.61 |
| 870 nm | 1(c) | 1 | 0.79 | 0.24 | 0.00 | 0.30 |
| " | 2(c) | 2 | 1.68 | 0.21 | 3.44 | 1.06 |
| " | 3(c) | 4 | 1.67 | 0.20 | 1.95 | 1.15 |
| " | 4 | 5 | 1.67 | 0.18 | 2.93 | 1.52 |
| " | 5 | 7 | 1.72 | 0.17 | 2.66 | 1.39 |
| " | 6 | 10 | 1.73 | 0.17 | 3.25 | 1.44 |
| " | 7 | 11 | 1.73 | 0.14 | 3.25 | 1.25 |

-continued

| Filter | Dye No | Chain Length | Dmax | Dmin | Con2 | Speed1 |
|---|---|---|---|---|---|---|
| " | 8 | 16 | 1.74 | 0.26 | 3.90 | 1.36 |

The data show a superior performance by the dyes of the invention, especially for exposure at longer wavelengths (>800 nm).

EXAMPLE 4

This example shows the use of substituted dyes 9 to 11 of the invention. The procedure of Example 3 was repeated, substituting 0.2% solutions of dyes 9 to 11 in MeOH/Et$_3$N (99:1) for the corresponding solutions of dyes 1 to 8. The quantities used were :
dye 9—3.5 ml; dye 10—7.5 ml, dye 11—3.5 ml.

The resulting coatings were exposed through a 780 nm narrow cut filter and processed for 10 seconds at 127° C., and the results are summarised in the following table:

| Dye No | Dmax | Dmin | Con2 | Speed1 |
|---|---|---|---|---|
| 9 | 1.68 | 0.16 | 3.08 | 1.17 |
| 10 | 1.65 | 0.13 | 2.17 | 1.10 |
| 11 | 1.71 | 0.09 | 5.32 | 1.22 |

EXAMPLE—5 (Non-Mercury)

The following formulation was prepared and coated on 3 mil (0.76×10$^{-4}$m) clear, polyester base at 175 microns wet thickness and dried at 70° C. for four minutes.

Homogenate A (as in Ex. 2) . . . 200 g
butanone . . . 50 ml
BUTVAR B-76 . . . 30.3 g
pyridinium hydrobromide perbromide . . . 0.18 g (in 3 ml MeOH)
Calcium bromide (10% soln in MeOH) . . . 1.3 ml
2-(4-chlorobenzoyl)benzoic acid (12% soln in MeOH) . . . 10 ml
5-methyl-2-mercaptobenzimidazole (1% soln in MeOH) . . . 12 ml
Developer B . . . 6.64 g
antifoggant A . . . 0.7 g The first 5 ingredients were mixed under minus blue safelight in the order given at 13° C. and held overnight at the same temperature. To 300 g of the resulting mixture were added (under IR safelight) varying amounts of Dye 2 and Dye 4 as 0.2% solution in methanol/triethylamine 99:1. The dye levels were the same as in Example 3 for Dye 2 and Dye 4 but higher levels of Dye 4 were also included. The dyes and quantities tested were:
Dye 2—2.25 ml; Dye 4—4.0 ml; Dye 4—8.0 ml; Dye 4—16.0 ml.

The identical photothermographic emulsions were also coated on 3 mil polyester base which was previously coated with an antihalation (AH) backing layer. The AH backing layer ingredients are listed below for a 100 gram batch.
Cellulose acetate butyrate (CAB-381-20) . . . 6.10 g
Butanone . . . 63.85 g
methanol/butanone solution—50/50 w//w . . . 30.00 g
AH Dye 1 . . . 0.05 g

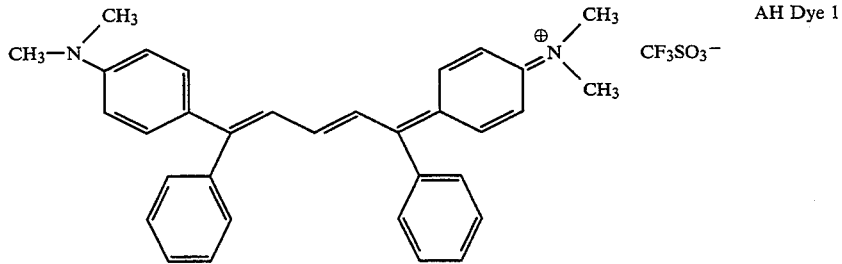

AH Dye 1

The 0.05 g of AH Dye 1 was first dissolved in the 50/50 mixture of methanol and butanone. The AH dye solution was then added to the CAB resin solution. The AH formulae were coated on 3 mil clear polyester at 80 microns wet thickness and dried at 75° C. for four minutes. The 780 nm absorbance was 0.38.

All the silver layers were overcoated with the following topcoat formula. The topcoat was coated at 100 microns wet thickness and dried at 70° C. for four minutes.
acetone . . . 140 ml
butanone . . . 67 ml
methanol . . . 27.5 ml
cellulose acetate . . . 9.0 g
phthalazine . . . 1.26 g
4-methylphthalic acid . . . 0.67 g
tetrachlorophthalic acid . . . 0.44 g
tetrachlorophthalic anhydride . . . 0.66 g The coated materials were then exposed with a laser sensitometer incorporating a 780 nm diode. After exposure, the film strips were processed at 250° F. for fifteen seconds. The wedges obtained were evaluated on a densitometer. Sensitometric results include Dmin, Dmax, Speed 2 (speed at a density of 1.0 above Dmin) and Con 1 (contrast measured on the slope of the line joining the density points of 0.50 and 1.70 above Dmin).

| Dye No | Dye Quantity | Chain Length | AH | Dmax | Dmin | Con 1 | Speed 2 | AH Spd Change |
|---|---|---|---|---|---|---|---|---|
| 2 | 2.25 ml | 2 | NO | 3.45 | 0.11 | 5.22 | 1.68 | — |
| 2 | 2.25 ml | 2 | YES | 3.54 | 0.14 | 4.78 | 1.35 | −0.33 |
| 4 | 4.0 ml | 5 | NO | 3.49 | 0.10 | 4.36 | 1.67 | — |
| 4 | 4.0 ml | 5 | YES | 3.52 | 0.13 | 4.22 | 1.48 | −0.19 |
| 4 | 8.0 ml | 5 | NO | 3.36 | 0.11 | 4.55 | 1.73 | — |
| 4 | 8.0 ml | 5 | YES | 3.29 | 0.14 | 4.56 | 1.59 | −0.14 |

| Dye No | Dye Quantity | Chain Length | AH | Dmax | Dmin | Con 1 | Speed 2 | AH Spd Change |
|---|---|---|---|---|---|---|---|---|
| 4 | 16.0 ml | 5 | NO | 3.40 | 0.11 | 4.42 | 1.80 | — |
| 4 | 16.0 ml | 5 | YES | 3.45 | 0.14 | 4.51 | 1.68 | −0.12 |

The data show a superior performance by the dye of the invention (Dye 4). The longer alkyl chain dyes (Dye 4-Dye 11) can be used, and prefer to be used at higher loadings which gives acutance effects leading to lower speed losses when coated on antihalation layers. The net result was Dye 4 gave twice the sensitivity (+0.33 log E) of Dye 2 when both were coated on antihalation materials. The Dmin increase of 0.03 in the table when coating on the AH layers were due to the 0.03 visual absorbance of the non-bleaching AH layer.

EXAMPLE 6

Dyes (12) to (16) were tested in the photothermographic media described in Example 3. All were found to be effective sensitisers, as summarised in the following Table:

| Dye No. | Sensitivity Range (nm) | Sensitivity Max (nm) |
|---|---|---|
| 12 | 550 to 920 | 840 |
| 13 | 620 to 980 | 850 |
| 14 | 540 to 910 | 820 |
| 15 | 600 to 860 | 810 |
| 16 | 540 to 840 | 750 |

We claim:

1. A photothermographic element having a photosensitive medium comprising silver halide, a reducible silver source and a reducing agent for silver ion, characterised in that the medium includes as a sensitising dye a heptamethine cyanine dye characterised in that both nitrogen atoms of the cyanine chromophore bear a carboxyalkyl substituent comprising an alkyl chain of at least five carbon atoms.

2. A photothermographic element according to claim 1 wherein said dye is a heptamethine cyanine dye having a nucleus represented by Formula (I):

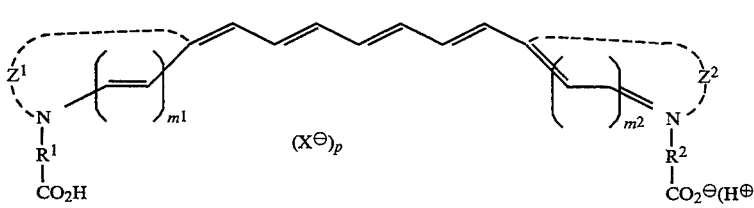

wherein;
p is 0 or 1,
$m^1$ and $m^2$ are independently 0 or 1,
$X^\ominus$ represents an anion,
$R^1$ and $R^2$ are independently members selected from the groups of alkylene groups having from 5 to 25 carbon atoms, and
$Z^1$ and $Z^2$ independently represent the atoms necessary to complete a heterocyclic ring or fused ring system.

3. A photothermographic element according to claim 1 wherein said dye is a compound having a nucleus of general formula:

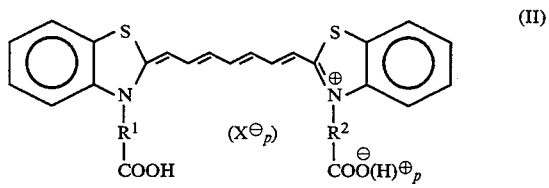

wherein;
p, $X^\ominus$, $R^1$ and $R^2$ are as defined in claim 2.

4. A photothermographic element according to claim 1 wherein said heptamethine cyanine dye is present in an amount of from 0.5 to 500 mg per mole of silver halide.

5. A photothermographic element according to claim 1 wherein said reducible silver source is silver behenate.

6. A photothermographic element according to claim 1 wherein said reducing agent for silver ion is a member selected from the group consisting of phenidone, hydroquinone, catechol and a hindered phenol.

7. A photothermographic element according to claim 6 wherein said reducing agent is a hindered phenol having a nucleus of general Formula (III):

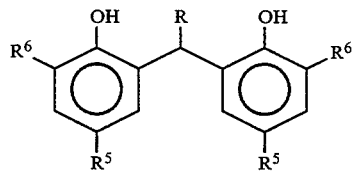

wherein;
R is a member selected from the group consisting of hydrogen and an alkyl group comprising up to 10 carbon atoms and $R^5$ and $R^6$ independently represent alkyl groups of up to 5 carbon atoms.

8. A photothermographic element according to claim 1 wherein said reducing agent is used in combination with a toner.

9. A photothermographic element according to claim 8 wherein said toner is a member selected from the group consisting of phthalazinone, phthalazine and phthalic acid.

10. A photothermographic element according to claim 1 wherein said photosensitive medium further comprises an antifoggant.

11. A photothermographic element according to claim 10 wherein said antifoggant comprises a heterocyclic compound bearing one or more substituents represented by —CX$^1$X$^2$X$^3$ where X$^1$ and X$^2$ are halogen and X$^3$ is a member selected from the group consisting of hydrogen and halogen.
12. A photothermographic element according to claim 11 wherein said antifoggant is a member selected from the group consisting of:
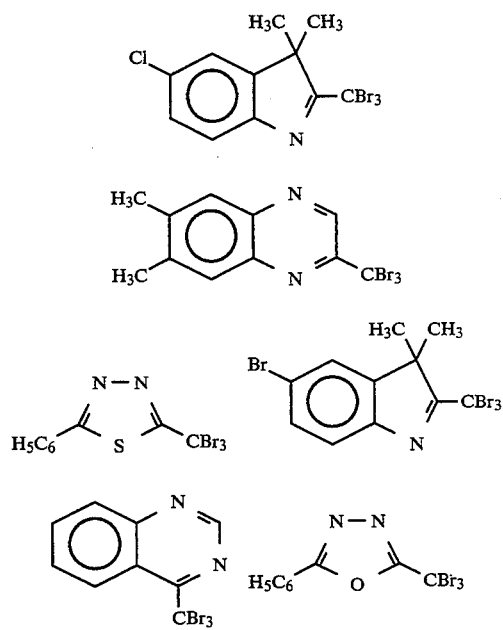
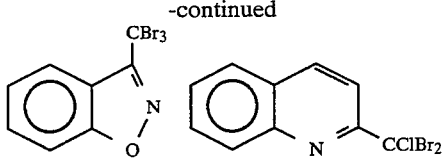
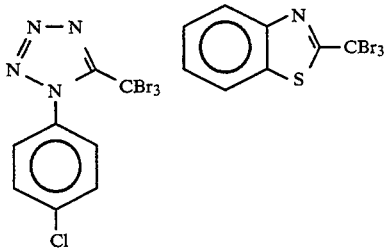
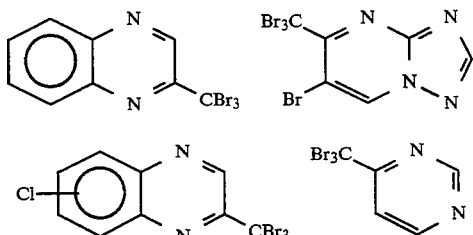
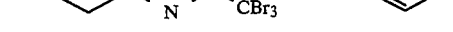
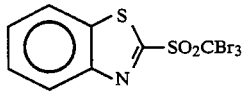
* * * * *

UNITED STATES PATENT AND TRADEMARK OFFICE
CERTIFICATE OF CORRECTION

PATENT NO. : 5,393,654
DATED : February 28, 1995
INVENTOR(S) : Burrows et al.

It is certified that error appears in the above-indentified patent and that said Letters Patent is hereby corrected as shown below:

Column 11, line 32, delete "moire"
and insert --more--.

Signed and Sealed this

Fourth Day of July, 1995

Attest:

BRUCE LEHMAN

*Attesting Officer*   *Commissioner of Patents and Trademarks*